US 12,147,263 B2

(12) United States Patent
Han et al.

(10) Patent No.: US 12,147,263 B2
(45) Date of Patent: Nov. 19, 2024

(54) LOW POWER SYSTEM ON CHIP

(71) Applicant: Electronics and Telecommunications Research Institute, Daejeon (KR)

(72) Inventors: Kyuseung Han, Daejeon (KR); Tae Wook Kang, Daejeon (KR); Sung Eun Kim, Daejeon (KR); Hyuk Kim, Daejeon (KR); Hyung-Il Park, Daejeon (KR); Kwang Il Oh, Daejeon (KR); Jae-Jin Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 64 days.

(21) Appl. No.: 17/847,636

(22) Filed: Jun. 23, 2022

(65) Prior Publication Data
US 2022/0413544 A1    Dec. 29, 2022

(30) Foreign Application Priority Data

Jun. 25, 2021    (KR) .................. 10-2021-0082973

(51) Int. Cl.
| G06F 1/00 | (2006.01) |
| G06F 1/10 | (2006.01) |
| G06F 15/78 | (2006.01) |

(52) U.S. Cl.
CPC ............ G06F 1/10 (2013.01); G06F 15/7817 (2013.01)

(58) Field of Classification Search
CPC ........ G06F 1/10; G06F 15/7817; G06F 1/324; G06F 1/3287; G06F 15/7825; G06F 1/3237; G06F 1/3243; Y02D 10/00
See application file for complete search history.

(56) References Cited

U.S. PATENT DOCUMENTS

| 7,576,582 B2 | 8/2009 | Lee et al. |
| 8,402,295 B2 | 3/2013 | Bhoj |
| 8,904,199 B2 | 12/2014 | Han |
| 9,571,341 B1* | 2/2017 | Kumar .................. G06N 5/045 |
| 10,067,556 B2 | 9/2018 | Hickey et al. |

(Continued)

FOREIGN PATENT DOCUMENTS

| JP | 2008-532169 | 8/2008 |
| KR | 10-2017-0092451 | 8/2017 |

(Continued)

*Primary Examiner* — Xuxing Chen
(74) *Attorney, Agent, or Firm* — KILE PARK REED & HOUTTEMAN PLLC

(57) ABSTRACT

A low power system on chip for supporting partial clock gating is provided. The system on chip includes a network on chip including a first CG-network interface module, a second CG-network interface module, and a clock gating control module, a first IP block that communicates through the first CG-network interface module, and a second IP block that communicates through the second CG-network interface module. The clock gating control module receives a clock gating request from the first IP block, outputs a communication control signal to the second CG-network interface module in response to the received clock gating request, and performs a clock gating operation for a clock signal in response to the received clock gating request to selectively deliver the clock signal to the second IP block.

20 Claims, 8 Drawing Sheets

(56) References Cited

U.S. PATENT DOCUMENTS

| | | |
|---|---|---|
| 10,587,265 B2 | 3/2020 | Shon et al. |
| 2002/0152407 A1* | 10/2002 | Alia ...................... G06F 1/3287 713/300 |
| 2007/0011641 A1* | 1/2007 | Nishikawa ................ G06F 1/10 716/130 |
| 2008/0215786 A1 | 9/2008 | Goossens et al. |
| 2013/0111071 A1* | 5/2013 | Kreissig ................ G06F 30/343 710/8 |
| 2015/0113214 A1* | 4/2015 | Sutardja .............. G06F 12/0864 711/106 |
| 2016/0180006 A1* | 6/2016 | Bandyopadhyay ......................... G01R 31/31705 716/112 |
| 2017/0220495 A1* | 8/2017 | Jeon .................... G06F 13/1689 |
| 2018/0074572 A1* | 3/2018 | Bauman ................ G06F 1/3287 |
| 2019/0212768 A1* | 7/2019 | Rangarajan ............. G06F 1/266 |
| 2019/0278357 A1* | 9/2019 | Lee ........................... G06F 1/06 |
| 2021/0073166 A1* | 3/2021 | Jeon .......................... G06F 1/10 |
| 2021/0141412 A1* | 5/2021 | Jeon .......................... G06F 1/08 |
| 2022/0206559 A1* | 6/2022 | Rangarajan ........... G06F 1/3237 |

FOREIGN PATENT DOCUMENTS

| | | |
|---|---|---|
| KR | 10-2018-0033149 | 4/2018 |
| KR | 10-2019-0084443 | 7/2019 |

\* cited by examiner

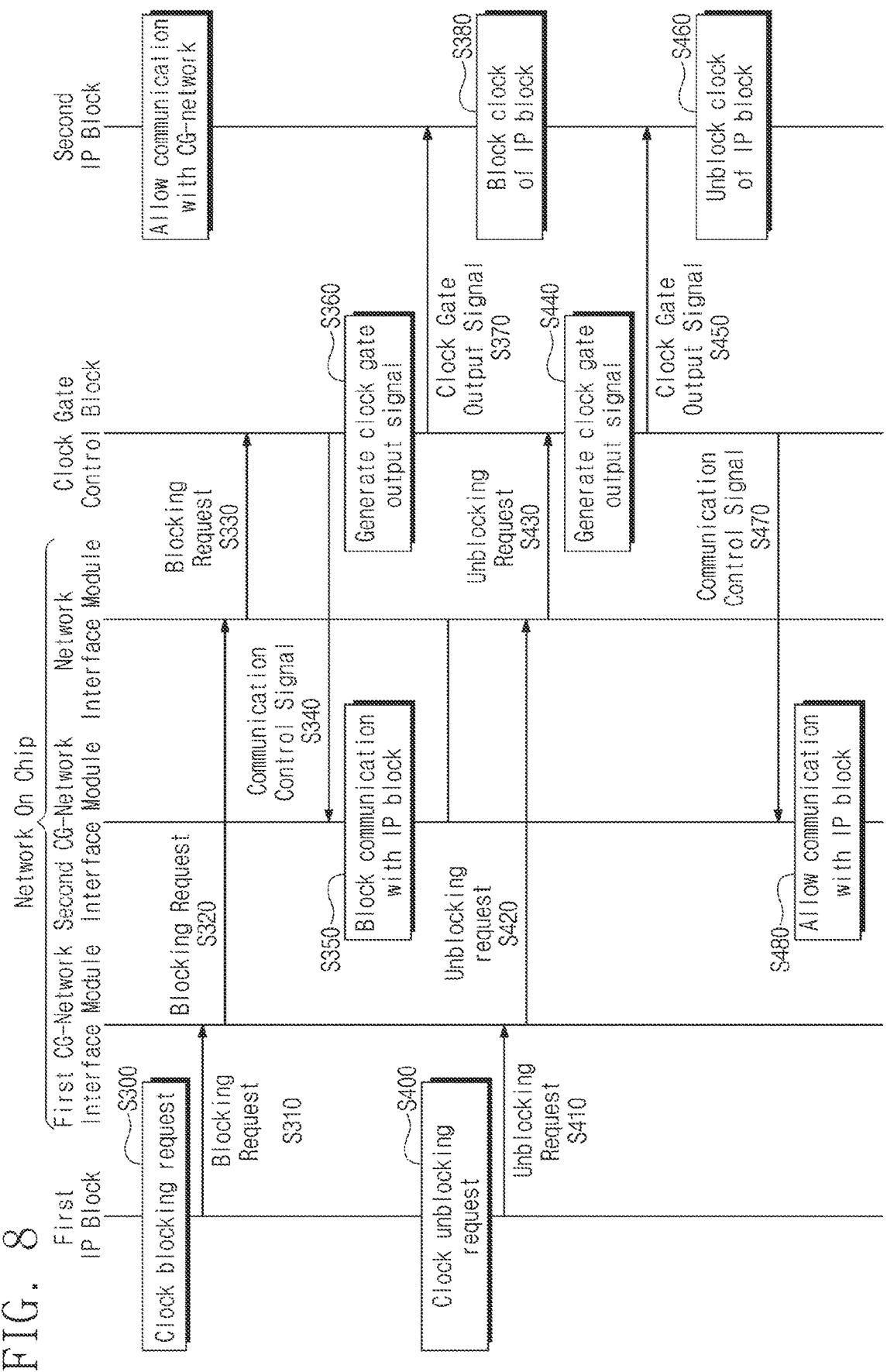

LOW POWER SYSTEM ON CHIP

CROSS-REFERENCE TO RELATED APPLICATIONS

This application claims priority under 35 U.S.C. § 119 to Korean Patent Application No. 10-2021-0082973 filed on Jun. 25, 2021, in the Korean Intellectual Property Office, the disclosures of which are incorporated by reference herein in their entireties.

BACKGROUND

Embodiments of the present disclosure described herein relate to an electronic device, and more particularly, relate to a low power system on chip (SoC).

An SoC is a technology for intensively implementing a complicated system, which performs various functions, into one chip. As the demand for integration and high performance of the SoC has been raised, the degree of integration of the SoC has been increased and the number of intellectual properties (IPs) included in the SoC has been increased. Thus, a technology for controlling power consumed by each of the IPs is required.

There are a method for reducing static power and a method for reducing dynamic power as the way to reduce power consumption of the SoC. There is a method for blocking a clock signal necessary for operations of IP blocks by means of clock gating, when IP blocks do not operate or are in an idle state to reduce power during an operation of the SoC as the way to reduce dynamic power consumption.

SUMMARY

Embodiments of the present disclosure are to address the above-mentioned technical problems. For example, embodiments of the present disclosure provide a low power system on chip (SoC) for supporting partial clock gating, without redesigning an IP.

According to an embodiment, a network on chip may include a first clock gate circuit (CG)-network interface module that supports communication of a first intellectual property (IP) block, a second CG-network interface module that supports communication of a second IP block, and a clock gating control module. The clock gating control module may receive a clock gating request from the first IP block, may output a communication control signal to the second CG-network interface module in response to the received clock gating request, and may perform a clock gating operation for a clock signal in response to the received clock gating request to selectively deliver the clock signal to the second IP block.

In an embodiment of the present disclosure, the network on chip may further include a router module that controls communication between the first CG-network interface module and the second CG-network interface module.

In an embodiment of the present disclosure, the network on chip may further include a network interface that supports communication between the clock gating control module and the first CG-network interface module.

In an embodiment of the present disclosure, the network on chip may further include a router module that controls the communication between the clock gating control module and the first CG-network interface module.

In an embodiment of the present disclosure, the communication control signal may be a signal requesting the second CG-network interface module not to allow communication with the second IP block, when the received clock gating request indicates blocking a clock of the second IP block. The clock gating control module may block the clock signal such that the clock signal is not delivered to the second IP block.

In an embodiment of the present disclosure, the clock gating control module may block the clock signal, after the second CG-network interface module blocks the communication with the second IP block.

In an embodiment of the present disclosure, the communication control signal may be a signal requesting the second CG-network interface module to allow communication with the second IP block, when the received clock gating request indicates unblocking a clock of the second IP block. The clock gating control module may deliver the clock signal to the second IP block.

In an embodiment of the present disclosure, the clock gating control module may deliver the clock signal to the second IP block, before the second CG-network interface module allows the communication with the second IP block.

In an embodiment of the present disclosure, the clock gating control module may include a clock gate that performs the clock gating operation.

According to an embodiment, a low power system on chip may include a network on chip including a first CG-network interface module, a second CG-network interface module, and a clock gating control module, a first IP block that communicates through the first CG-network interface module, and a second IP block that communicates through the second CG-network interface module. The clock gating control module may receive a clock gating request from the first IP block, may output a communication control signal to the second CG-network interface module in response to the received clock gating request, and may perform a clock gating operation for a clock signal in response to the received clock gating request to selectively deliver the clock signal to the second IP block.

In an embodiment of the present disclosure, the system on chip may further include a phase-locked loop (PLL) block that generates the clock signal and provides the generated clock signal to the clock gating control module.

In an embodiment of the present disclosure, the network on chip may further include a router module that controls communication between the first CG-network interface module and the second CG-network interface module.

In an embodiment of the present disclosure, the network on chip may further include a network interface that supports communication between the clock gating control module and the first CG-network interface module.

In an embodiment of the present disclosure, the network on chip may further include a router module that controls the communication between the clock gating control module and the first CG-network interface module.

In an embodiment of the present disclosure, the communication control signal may be a signal requesting the second CG-network interface module not to allow communication with the second IP block, when the received clock gating request indicates blocking a clock of the second IP block. The clock gating control module may block the clock signal such that the clock signal is not delivered to the second IP block.

In an embodiment of the present disclosure, the clock gating control module may block the clock signal, after the second CG-network interface module blocks the communication with the second IP block.

In an embodiment of the present disclosure, the communication control signal may be a signal requesting the second CG-network interface module to allow communication with the second IP block, when the received clock gating request indicates unblocking a clock of the second IP block. The clock gating control module may deliver the clock signal to the second IP block.

In an embodiment of the present disclosure, the clock gating control module may deliver the clock signal to the second IP block, before the second CG-network interface module allows the communication with the second IP block.

In an embodiment of the present disclosure, the first IP block may perform a processor function.

In an embodiment of the present disclosure, the clock gating control module may include a clock gate that performs the clock gating operation.

BRIEF DESCRIPTION OF THE FIGURES

The above and other objects and features of the present disclosure will become apparent by describing in detail embodiments thereof with reference to the accompanying drawings.

FIG. 8 is a signal sequence diagram illustrating an operation method of an SoC of FIG. 6, according to an embodiment of the present disclosure.

DETAILED DESCRIPTION

Hereinafter, embodiments of the present disclosure will be described clearly and in detail to such an extent that those skilled in the art easily carry out the present disclosure. Specific details such as detailed components and structures are merely provided to assist the overall understanding of the embodiments of the present disclosure. Therefore, changes and modifications of the embodiments described herein may be made by those skilled in the art without departing from the spirit and scope of the present disclosure. In addition, descriptions of the well-known functions and structures are omitted for clarity and simplicity. The following drawings or components in the detailed description may be connected with any other components except for components illustrated in a drawing or described in the detailed description. The terms described in the present disclosure are terms defined in consideration of the functions in the present disclosure and are not limited to a specific function. The definitions of the terms should be determined based on the contents throughout the specification.

Components that are described with reference to the term "unit", "module", or "block" used in the detailed description may be implemented with software, hardware, or a combination thereof. For example, the software may be a machine code, firmware, an embedded code, and application software. For example, the hardware may include an electrical circuit, an electronic circuit, a processor, a computer, integrated circuit cores, a pressure sensor, an inertial sensor, a microelectromechanical system (MEMS), a passive element, or a combination thereof.

Figure 1:
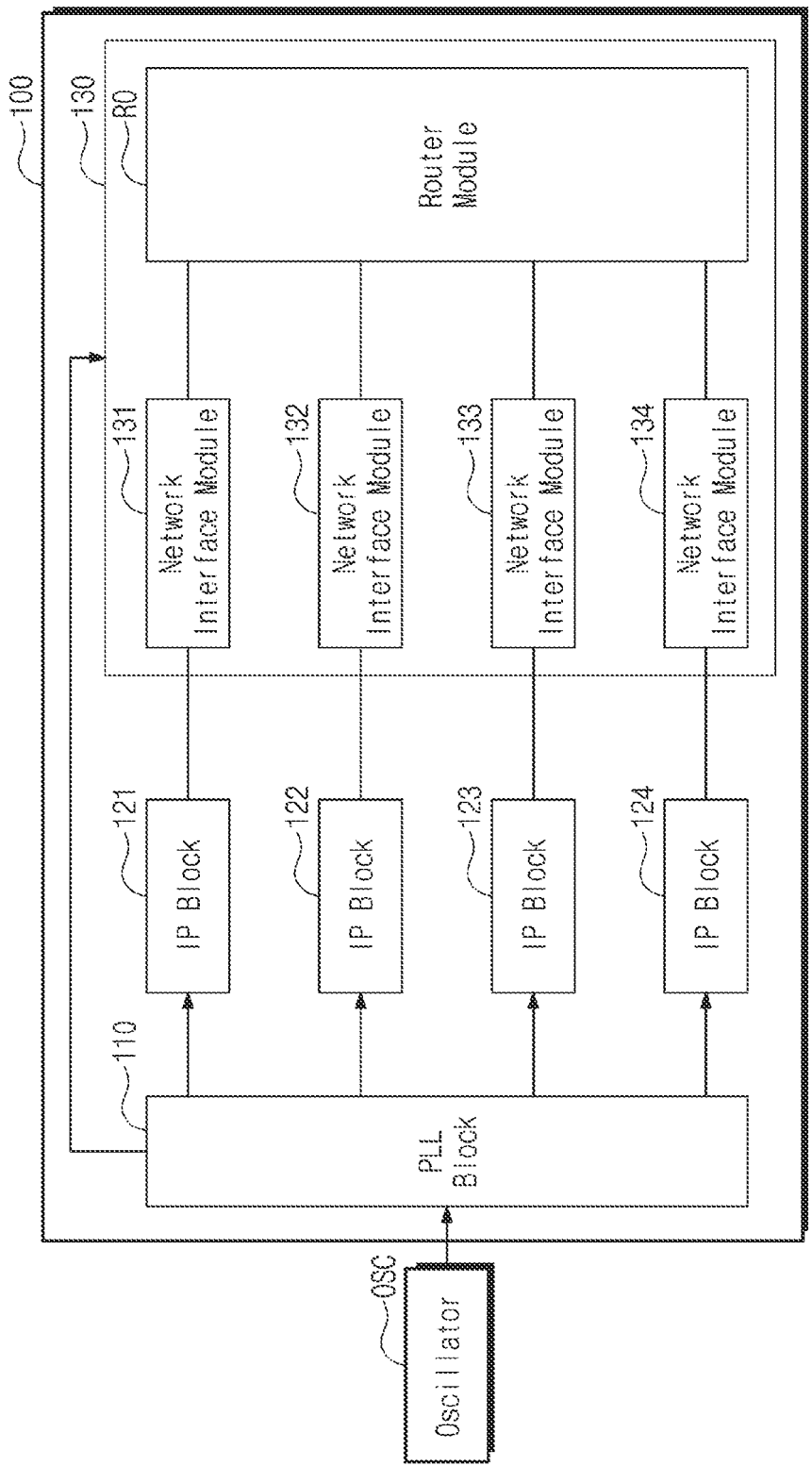
FIG. 1 is a block diagram illustrating a structure of a system on chip (SoC), according to the present disclosure.

FIG. 1 illustrates a structure of a system on chip (SoC) according to the present disclosure. Referring to FIG. 1, an SoC 100 may include a phase-locked loop (PLL) block 110, a plurality of intellectual property (IP) blocks 121-124, and a network on chip 130. Meanwhile, an oscillator OSC may be present outside the SoC 100.

The oscillator OSC may generate a clock signal and may provide the clock signal to the SoC 100. For example, the oscillator OSC may provide the clock signal to the PLL block 110.

In an embodiment, the clock signal may be a square wave in which an interval where a high-level voltage is output and an internal where a low-level voltage is output are periodically repeated, but the scope of the present disclosure is not limited thereto and may include various embodiments which provide a periodical signal such as a triangular wave or a sine wave.

In an embodiment, the oscillator OSC may be implemented inside or outside the SoC 100. For example, it is described that the oscillator OSC is implemented outside the SoC 100 in embodiments of the present disclosure, but the scope of the present disclosure may include an embodiment where the oscillator OSC is included in the SoC 100.

The PLL block 110 may convert the clock signal received from the oscillator OSC into various types of clock signals respectively required by the plurality of IP blocks 121-124 and may respectively provide the converted clock signals to the plurality of IP blocks 121-124. For example, when the plurality of IP blocks 121-124 respectively require first to fourth types of clock signals, the PLL block 110 may convert the clock signal received from the oscillator OSC to generate the first to fourth types of clock signals and may respectively provide the generated clock signals to the plurality of IP blocks 121-124. In an embodiment, the PLL block 110 may further provide a clock signal necessary for a function of the network on chip 130.

The oscillator SCO and the PLL block 110 are described as divided functional components in the present disclosure, but the PLL block and the oscillator may be integrated into one component or may be subdivided into lower circuit elements without departing from the core of the technical spirit of the present disclosure. In an embodiment, the SoC may not include the PLL block, and a plurality of oscillators respectively corresponding to the plurality of IP blocks may be implemented inside or outside the SoC.

Each of the plurality of IP blocks 121-124 may be responsible for a specific function used in the SoC 100. For example, each of the plurality of IP blocks 121-124 may refer to a functional block such as a processor core, a memory, an interface module, a signal processor, or an input/output circuit and may be implemented as a hard-IP in a state where it is physically implemented, a soft IP developed in a synthesizable register-transfer level (RTL), a firm IP of a gate level netlist, and/or a combination thereof.

Each of the plurality of IP blocks 121-124 may receive the clock signal from the PLL block 110 to perform a specific function. For example, each of the plurality of IP blocks 121-124 may receive the clock signal converted by means of the PLL block 110 and may perform the specific function.

In an embodiment, the clock signal may be used to perform a function of the IP block. For example, when the IP block is a block which performs a memory function, it may perform a read or write operation depending on a command received through a network interface module. In this case, the clock signal may be used to control a speed difference in the read or write operation. However, the scope of the present disclosure is not limited to the case where the IP block performs the memory function, which may include the above-mentioned various types of IP blocks.

The network on chip 130 may support communication between the plurality of IP blocks 121-124. For example, the network on chip 130 may include a plurality of network interface modules 131-134 and a router module RO. The network on chip 130 may match a communication standard or protocol with a corresponding IP block by means of the plurality of network interface modules 131-134 and may support communication with the corresponding IP block.

The network interface modules 131-134 may correspond to the plurality of IP blocks 121-124, respectively. The network interface modules 131-134 may communicate with the corresponding IP blocks 121-124, respectively, to receive or transmit a signal.

The router module RO may control communication through the network interface modules 131-134 between the plurality of IP blocks 121-124. For example, the router module RO may prevent an error capable of occurring as communications between the plurality of IP blocks 121-124 collide with each other. In this case, a parallel communication environment between the IP blocks 121-124 may be implemented by the network on chip 130.

For a brief description, the SoC 100 including the four IP blocks 121-124 and the four network interface modules 131-134 is illustrated in FIG. 1. However, the scope of the present disclosure is not limited to the number of IP blocks and the number of network interface modules.

Figure 2:
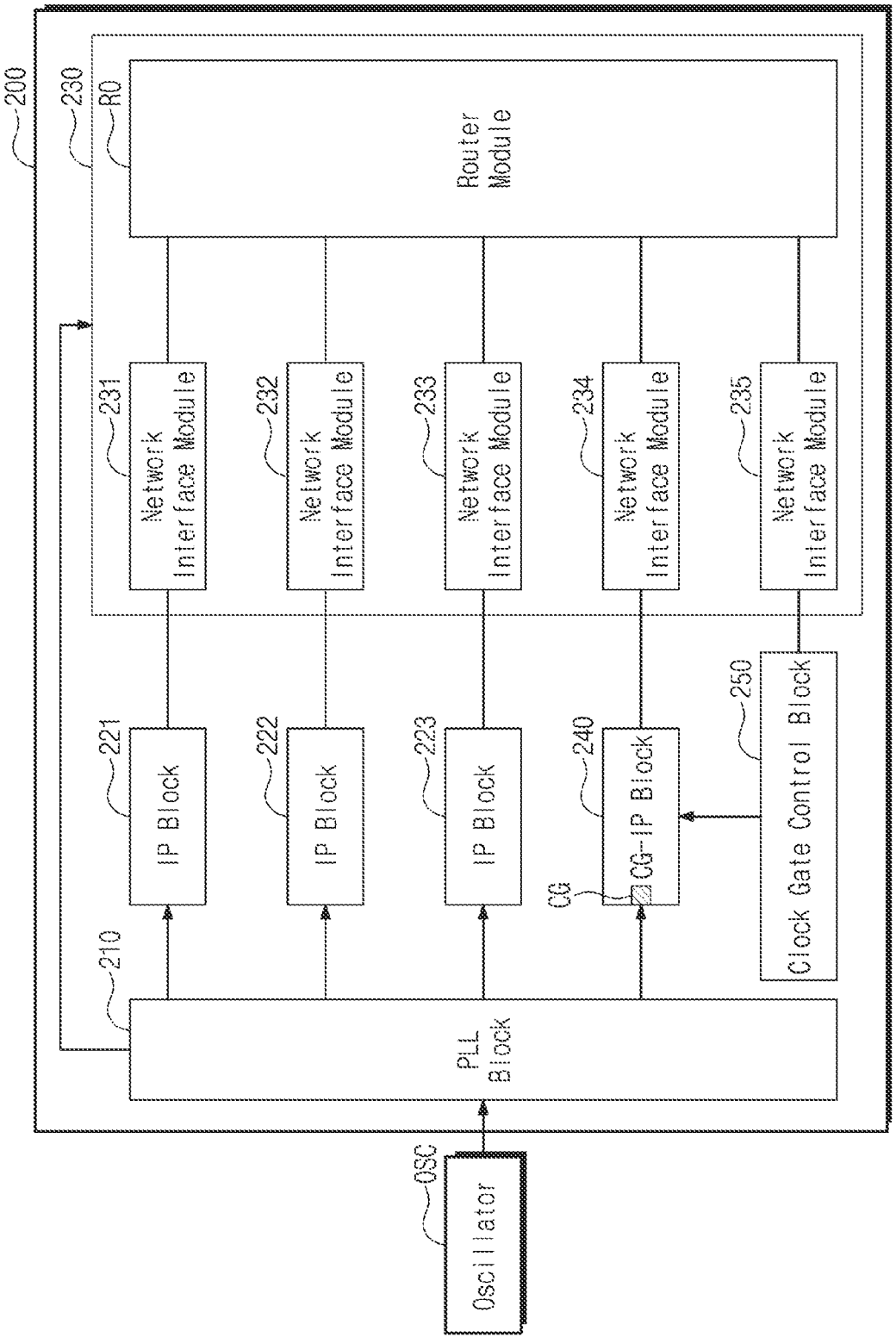
FIG. 2 is a block diagram illustrating an SoC for supporting partial clock gating, according to the present disclosure.

FIG. 2 illustrates an SoC for supporting partial clock gating according to the present disclosure. Referring to FIG. 2, an SoC 200 may include a PLL block 210, a plurality of IP blocks 221-223, a clock gate circuit (CG)-IP block 240, and a network on chip 230 and may further include a clock gate control block 250. The SoC 200 may receive a clock signal from an oscillator OSC. Because a description of the oscillator OSC, the PLL block 210, the IP blocks 221-223, the network on chip 230, and lower components thereof is similar to that described with reference to FIG. 1, a detailed description thereof will be omitted.

The CG-IP block 240 may receive a clock signal from the PLL block 210 and may perform a clock gating function. For example, unlike the other IP blocks 221-223, the CG-IP block 240 may further include a clock gate circuit CG. Because the function of the CG-IP block 240 is similar to that of an IP block of FIG. 1, a description thereof will be omitted.

The clock gate circuit CG may receive a clock signal from the PLL block 210 and may receive a clock gate control signal from the clock gate control block 250, thus blocking the clock signal.

In an embodiment, when the clock signal is not blocked by the clock gate circuit CG, the CG-IP block 240 may operate to be similar to an IP block described with reference to FIG. 1. For example, the CG-IP block 240 may communicate with the other IP blocks 221-223 though the network on chip 230 to transmit and receive data and/or a signal.

In an embodiment, when the clock signal is blocked by the clock gate circuit CG, the CG-IP block 240 may be in an idle state. In this case, dynamic power consumption of the CG-IP block 240 may be reduced.

The configuration and operation of the clock gate circuit CG included in the CG-IP block 240 will be described in detail with reference to FIGS. 3 and 4 below.

Each of the plurality of network interface modules 231-235 may correspond to one of the IP blocks 221-223, the CG-IP block 240, and the clock gate control block 250. For example, the first network interface module 231 may correspond to the first IP block 221, the second network interface module 232 may correspond to the second IP block 222, and the third network interface module 233 may correspond to the third IP block 223. The fourth network interface module 234 may correspond to the CG-IP block 240. The fifth network interface module 235 may correspond to the clock gate control block 250.

The clock gate control block 250 may be connected with the network on chip 230 through the fifth network interface module 235. For example, the clock gate control block 250 may be connected with the network on chip 230 to be controlled by the first IP block 221 which performs a processor function among the plurality of IP blocks 221-223. In this case, the clock gate control block 250 may receive a command associated with the clock gate control signal through the network on chip 230 from the first IP block 221 which performs the processor function and may operate according to the received command.

It is described that clock gating is controlled by the IP block 221 which perform the processor function for a brief description, but the scope of the present disclosure may include that clock gating is controlled by an IP block which performs at least one of functions of a memory, an interface module, a signal processor, an input/output circuit, and the like. Furthermore, it is described that the one IP block 221 among the plurality of IP blocks 221-223 performs the processor function, but the scope of the present disclosure is not limited thereto and may include the case where one or more different IP blocks perform the processor function.

The clock gate control block 250 may transmit the clock gate control signal to the CG-IP block 240. The clock gate control signal may be a signal for determining whether the clock gate circuit CG of the CG-IP block 240 blocks the clock signal from the PLL block 210 and whether the CG-IP block 240 blocks communication with the fourth network interface module 234.

The three IP blocks 221-223 and the one CG-IP block 240 are illustrated in FIG. 2 for a brief description, but the scope of the present disclosure is not limited to the number of IP blocks and the number of CG-IP blocks. For example, according to an embodiment of the present disclosure, the SoC may include a plurality of CG-IP blocks. In this case, the SoC may include at least one or more clock gate control blocks which control the plurality of CG-IP blocks.

In an embodiment, a network interface may connect the one or more clock gate control blocks which control the plurality of CG-IP blocks with the network on chip.

Figure 3:
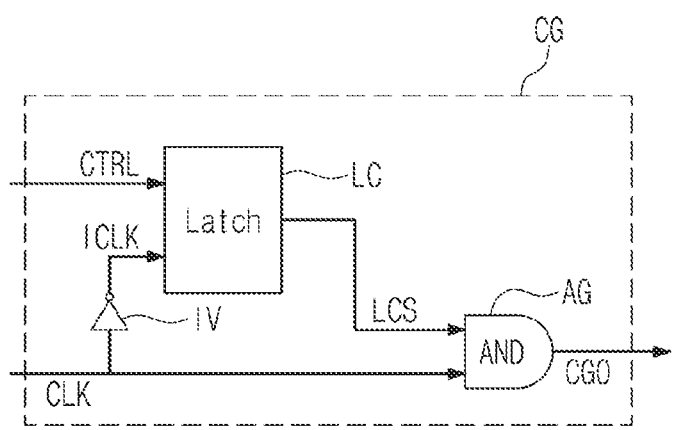
FIG. 3 illustrates an embodiment of implementing a clock gate circuit of FIG. 2.

FIG. 3 illustrates an embodiment of implementing a clock gate circuit of FIG. 2. Referring to FIGS. 2 and 3, a clock gate circuit CG may include an inverter IV, a latch LC, and an AND gate AG. The clock gate circuit CG may receive a clock signal CLK and a clock gate control signal CTRL. The clock gate circuit CG may block the clock signal CLK in response to the clock gate control signal CTRL. In an embodiment, the clock signal CLK may be provided from a PLL block 210, and the clock gate control signal CTRL may be provided from a clock gate control block 250.

The inverter IV may invert and output the clock signal CLK. For example, the inverter IV may generate an inverted clock signal ICLK into which the clock signal CLK is inverted.

The latch LC may receive the clock gate control signal CTRL and the inverted clock signal ICLK and may output a latch output signal LCS. For example, the latch LC may output the latch output signal LCS to the AND gate AG.

The AND gate AG may output a high-level signal when both of input two signals are high-level signals, the AND gate AG may output the high-level signal. Thus, when the latch output signal LCS output from the latch LC has a high level, the AND gate AG may output the clock signal CLK. For example, the AND gate AG may receive the clock signal CLK from the PLL block 210 and may receive the latch output signal LCS from the latch LC. The AND gate AG may generate and output a clock gate output signal CGO, based on the input signals. In this case, when the latch output signal LCS has the high level by the AND gate AG, the clock gate circuit CG may perform an operation of delivering the clock signal. When the latch output signal LCS has a low level, the clock gate circuit CG may perform an operation of blocking the clock signal.

Signals processed and/or generated by the inverter IV, the latch LC, and the AND gate AG will be described in detail with reference to FIG. 4 below.

Figure 4:
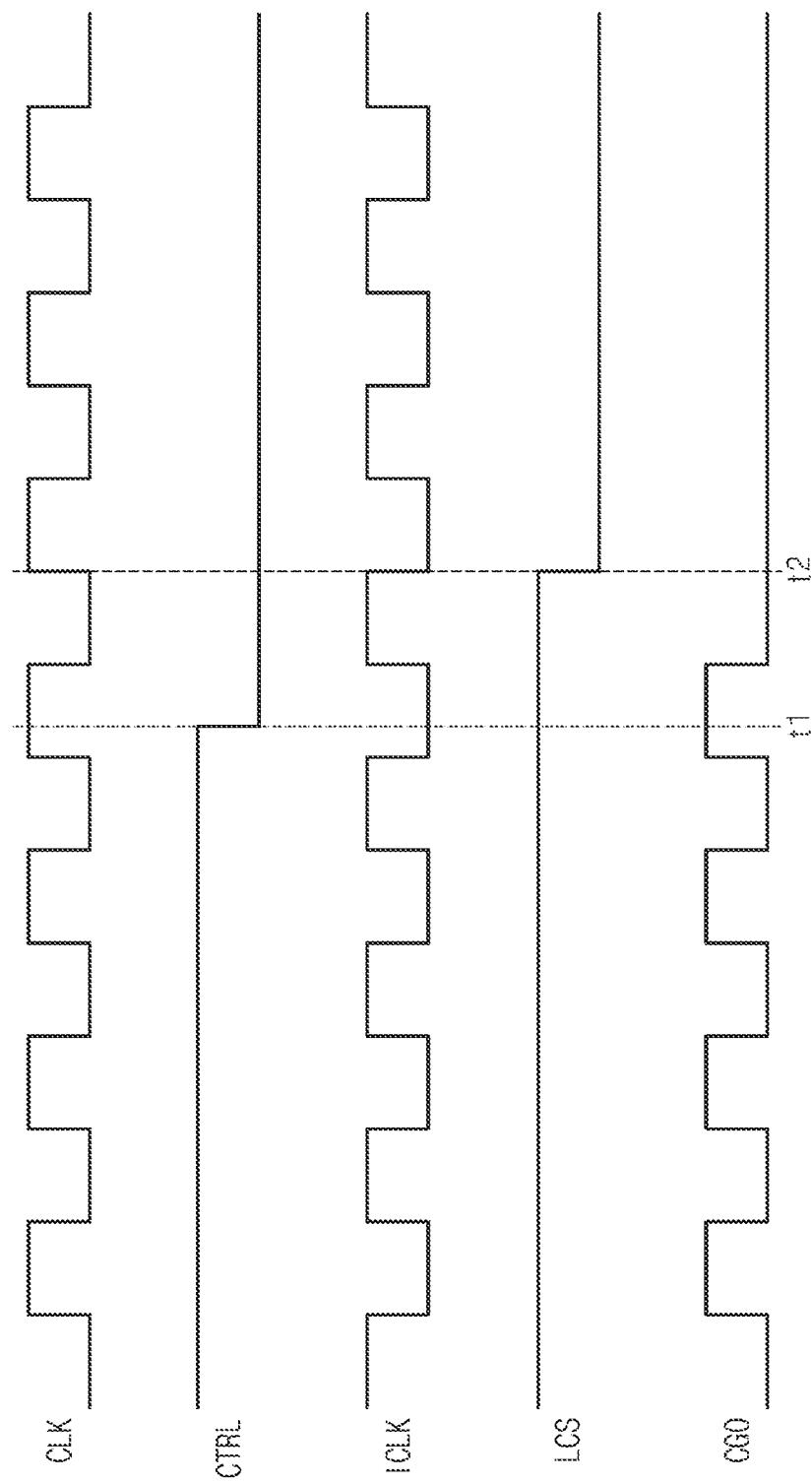
FIG. 4 is a timing diagram illustrating in detail signals of FIG. 3.

FIG. 4 is a timing diagram illustrating in detail signals of FIG. 3. Referring to FIGS. 3 and 4, an inverter IV may output an inverted clock signal ICLK into which a clock signal CLK is inverted. For example, the inverted clock signal ICLK may be contrary to the clock signal CLK in a time interval which is in a high level or a low level.

The latch LC may receive a clock gate control signal CTRL and the inverted clock signal ICLK and may output a latch output signal LCS. For example, the latch LC may output the latch output signal LCS which maintains the high level from a first time point when the clock gate control signal CTRL is converted into the low level to a second time point when a period when the clock signal CLK is toggled is completed. In this case, the clock gate output signal CGO identical to a period when the clock signal CLK toggles the low level and the high level may be generated by the latch LC.

An AND gate AG may receive the clock signal CLK from a PLL block 210 and may receive the latch output signal LCS from the latch LC, thus outputting the clock gate output signal CGO. For example, the AND gate AG may output the same signal as the clock signal CLK in only a time interval up to a second time point t2 when the latch output signal LCS maintains the high level. In other words, when the latch output signal LCS has the high level, a clock gate CG may perform a function of delivering the clock signal CLK by the AND gate AG.

in an embodiment, the clock gate output signal CGO may be delivered to various components which may be included in a CG-IP block 240.

In an embodiment, after a second time point t2 when the clock gate output signal CGO maintains the low level, dynamic power consumption of the CG-IP block 240 may be reduced.

Figure 5:
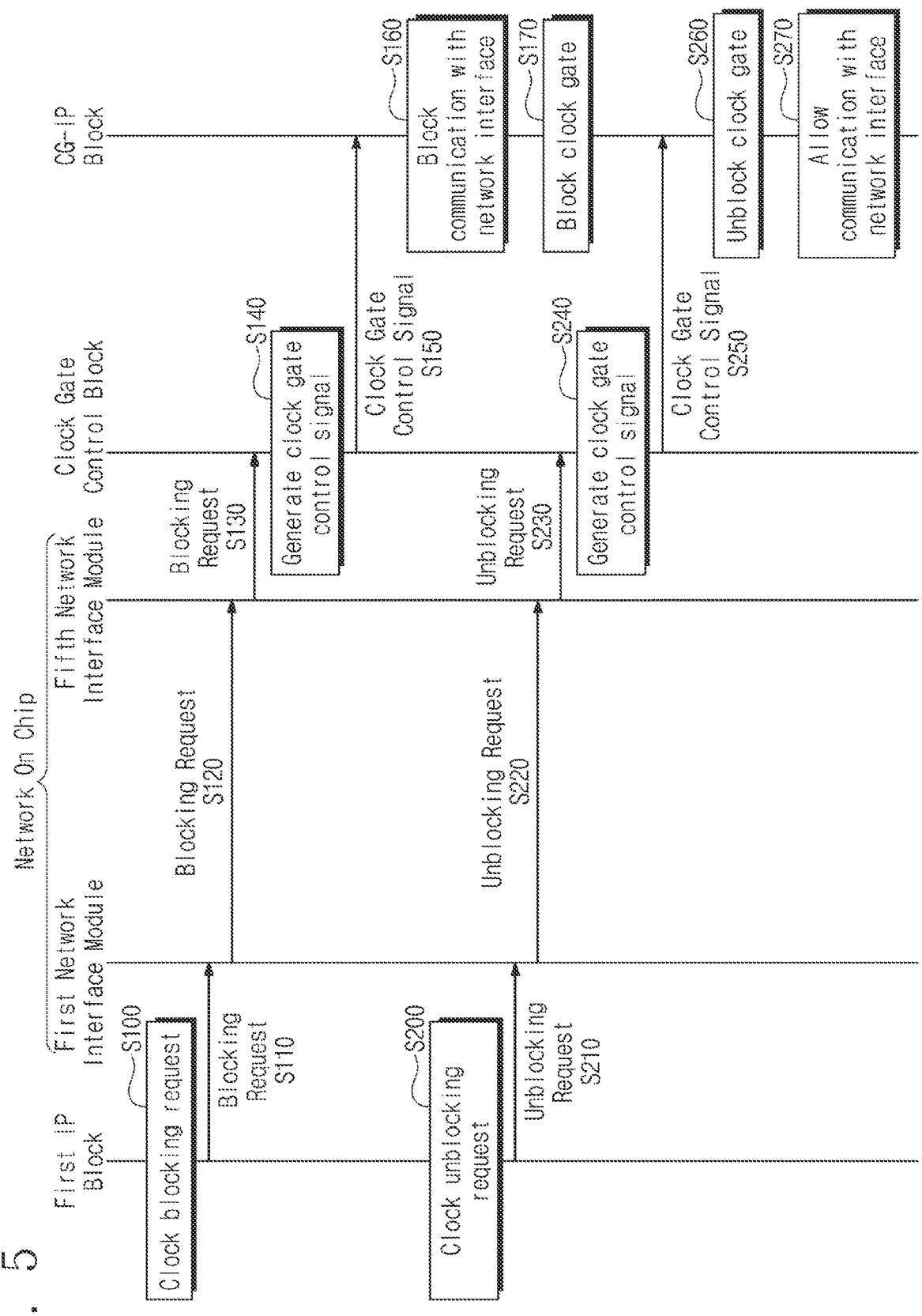
FIG. 5 is a signal sequence diagram illustrating an operation of an SoC of FIG. 2.

FIG. 5 is a signal sequence diagram illustrating an operation of an SoC of FIG. 2. Hereinafter, operations S100 to S190 indicating operations of an SoC 200 which responds to a clock signal blocking request of a host and operations S200 to S290 indicating operations of the SoC 200 which responds to a clock signal allowance request of the host will be described with reference to FIGS. 2 to 5.

First of all, in operation S100, a first IP block 221 may generate a request to block a clock signal of a CG-IP block 240. In an embodiment, the first IP block 221 may perform a processor function and may be a host device.

In operation S110, the first IP block 221 may deliver a clock blocking request of the host to a network on chip 230. For example, the first IP block 221 may deliver the clock blocking request to a first network interface module 231.

In operation S120, the first network interface module 231 may deliver the clock blocking request of the host to a fifth network interface module 235. For example, the fifth network interface module 235 may correspond to a clock gate control block 250. In an embodiment, the operation where the clock blocking request of the host is delivered from the first network interface module 231 to the fifth network interface module 235 may be performed by control of a router module RO.

In operation S130, the fifth network interface module 235 may deliver the clock blocking request of the host to the clock gate control block 250.

In operation S140, the clock gate control block 250 may generate a clock gate control signal in response to the clock blocking request of the host. In this case, the clock gate control signal may be a signal requesting to block a clock gate of the CG-IP block 240.

In operation S150, the clock gate control block 250 may deliver the clock gate control signal to the CG-IP block 240. For example, the clock gate control signal may be directly or indirectly delivered to the CG-IP block 240, without passing through the network interface module.

In operation S160, the CG-IP block 240 may block communication with a fourth network interface module 234, in response to the received clock gate control signal. For example, the CG-IP block 240 may invalidate communication signals transmitted to the fourth network interface module 234 or may provide a notification that it is not ready to receive communication signals transmitted by the fourth network interface module 234.

In operation S170, the CG-IP block 240 may block the clock gate in response to the received clock gate control signal. For example, a clock gate circuit CG included in the CG-IP block 240 may block a clock signal. In this case, the CG-IP block 240 may be in an idle state.

In an embodiment, as the SoC 200 blocks the communication of the CG-IP block 240 with the fourth network interface module 234 in operation S160 and blocks the clock gate of the CG-IP block 240 in operation S170, a communication error capable of being occurring between the CG-IP block 240 and the fourth network interface module 234 may be prevented.

Next, in operation S200, the first IP block 221 may generate a request to unblock the clock signal of the CG-IP block 240.

In operations S210 to S230, the first IP block 221 may deliver a clock unblocking request of the host to the clock gate control block 250 through a first network interface module 231 and a fifth network interface module 235. Because the operation performed in the SoC 200 to deliver the clocking unblocking request to the clock gate control block 250 in operations S210 to S230 is similar to operations S110 to S130 which are described above, a detailed description thereof will be omitted.

In operation S240, the clock gate control block 250 may generate a clock gate control signal in response to the clock unblocking request of the host. In this case, the clock gate control signal may be a signal requesting not to block the clock gate of the CG-IP block 240.

In operation S250, the clock gate control block 250 may deliver the clock gate control signal to the CG-IP block 240. Because the operation, performed in the SoC 200 to deliver the clock gate control signal, in operation S250, is similar to operation S150 which is described above, a detailed description thereof will be omitted.

In operation S260, the CG-IP block 240 may unblock the clock gate in response to the received clock gate control signal. For example, the clock gate circuit CG included in the CG-IP block 240 may not block the clock signal. In this case, the CG-IP block 240 may be in a state where it normally operates.

In operation S270, the CG-IP block 240 may allow communication with the fourth network interface module 234, in response to the received clock gate control signal. For example, the CG-IP block 240 may validate communication signals transmitted to the fourth network interface module 234 or may provide a notification that it is ready to receive communication signals transmitted by the fourth network interface module 234.

In an embodiment, irrespective of the clock blocking request or the clock unblocking request of the host, the CG-IP block 240 may be ready to communicate with the fourth network interface module 234.

In an embodiment, after the clock gate of the CG-IP block 240 is unblocked in operation S260, as the communication of the CG-IP block 240 with the fourth network interface module 234 is allowed in operation S270, a communication error capable of occurring between the CG-IP block 240 and the fourth network interface module 234 may be prevented.

Figure 6:
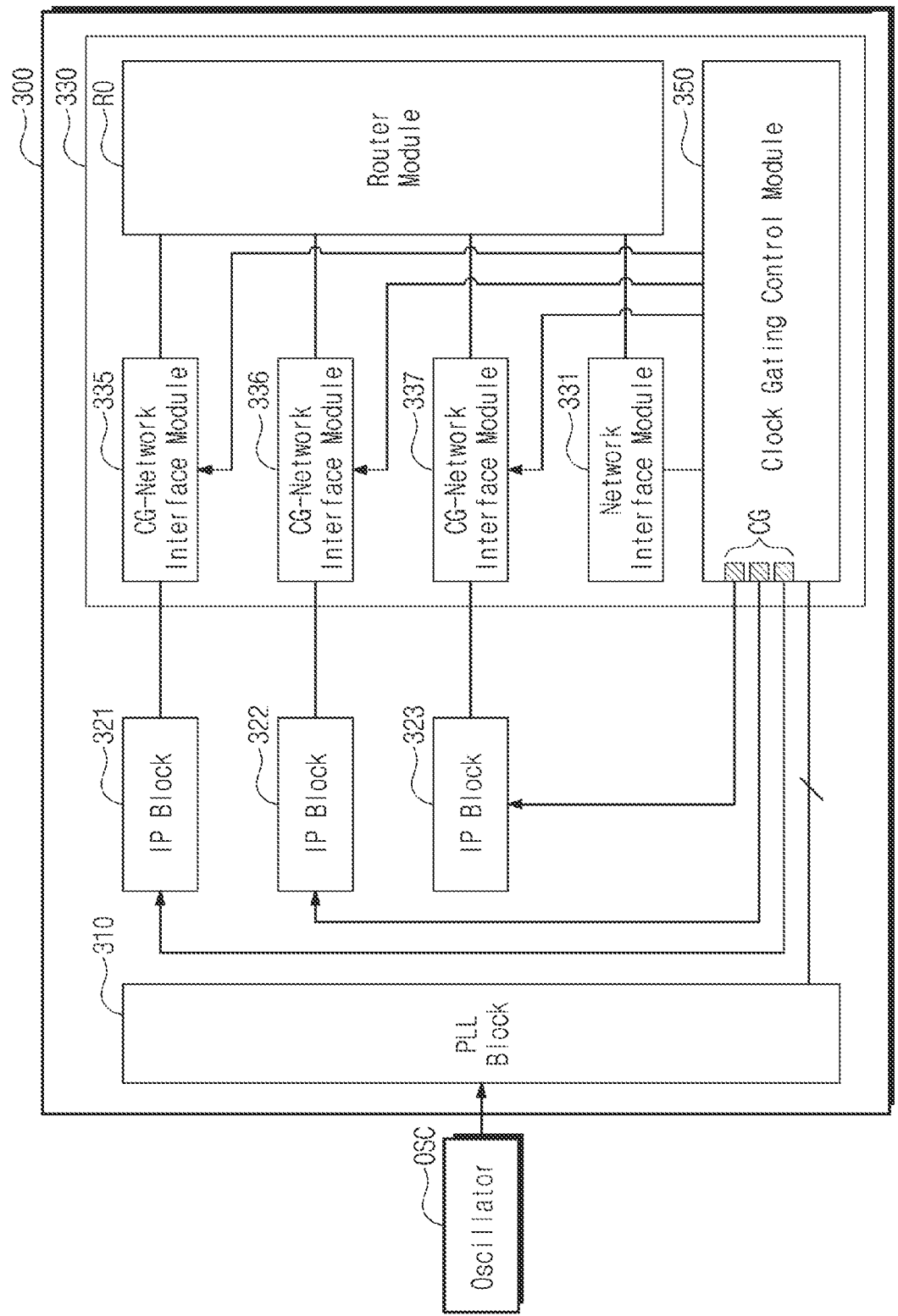
FIG. 6 is a block diagram illustrating an SoC according to an embodiment of the present disclosure.

FIG. 6 illustrates an SoC according to an embodiment of the present disclosure. Referring to FIG. 6, an SoC 300 may include a PLL block 310, a plurality of IP blocks 321-323, and a network on chip 330. Meanwhile, an oscillator OSC may be present outside the SoC 300. Because the oscillator OSC, the clock signal, a structure and a function of the PLL block 310, and structures and functions of the plurality of IP blocks 321-323 are similar to those described with reference to FIG. 1, a detailed description thereof will be omitted.

The PLL block 310 may deliver various types of clock signals to the network on chip 330. For example, the PLL block 310 may transmit one or more clock signals to a clock gating control module (clock gating controller) 350 of the network on chip 330.

The plurality of IP blocks 321-323 may transmit and receive data or a signal with each other through the network on chip 330. For example, the plurality of IP blocks 321-323 may receive a clock signal through the network on chip 330. In an embodiment, the clock signal received by the IP blocks 321-323 may be a signal output from a clock gate circuit CG.

The network on chip 330 may include a network interface module 331, a router module (router) RO, a plurality of CG-network interface modules (CG-network interfaces) 335-337, and the clock gating control module 350.

The network interface module 331 may support communication between the clock gating control module 350 and the plurality of CG-network interface modules 335-337. For example, the first IP block 321 which performs a processor function among the IP blocks 321-323 may specify the second IP block 322 to control a clock signal through clock gating control module 350 and the network interface module 331. The method where the clock gating control module 350 receives a signal from the first IP block 321 and controls the second IP block 322 will be described in detail below.

Each of the plurality of CG-network interface modules 335-337 may support communication between the plurality of IP blocks 321-323. For example, the first CG-network interface module 335 may support communication of the first IP block 321, the second CG-network interface module 336 may support communication of the second IP block 322, and the third CG-network interface module 337 may support communication of the third IP block 323.

In an embodiment, the plurality of CG-network interface modules 335-337 may match communication standards or protocols with the IP blocks 321-323 respectively corresponding thereto and may support communication with the IP blocks 321-323 respectively corresponding thereto.

In an embodiment, whether the plurality of CG-network interface modules 335-337 allow communication with the IP blocks 321-323 respectively corresponding thereto may be determined by the clock gating control module 350. The scheme where the clock gating control module 350 controls the CG-network interface modules 335-337 will be described in detail below.

The router module RO may control communications among the plurality of IP blocks 321-323 through the plurality of CG-network interface modules 335-337 and communication of the first IP block 321 with the clock gating control module 350 through the network interface module 331. For example, the router module RO may prevent an error which may occur as communications between the plurality of IP blocks 321-323 collide with each other. In this case, a parallel communication environment between the IP blocks 321-323 may be implemented by the network on chip 330.

The clock gating control module 350 may include a plurality of clock gate circuits CG. The plurality of clock gate circuits CG may correspond to the plurality of IP blocks 321-323, respectively. Because the detailed configuration and function of the clock gate circuit is described with reference to FIGS. 3 and 4, a detailed description thereof will be omitted.

In an embodiment, the clock gating control module 350 may receive a signal from the network interface module 331 and may provide a clock gate control signal to each of the plurality of clock gate circuits CG. The clock gating control module 350 may receive various types of clock signals from the PLL block 310 and may provide the clock signal to each of the plurality of clock gate circuits CG.

In an embodiment, clock gate output signals output from the clock gate circuits CG may be provided to the plurality of IP blocks 321-323, respectively. For example, when the clock gate control signal requesting to block a clock is input, the clock gate circuit CG may not provide a clock signal to the corresponding IP block (e.g., the second IP block 322). When the clock gate control signal requesting to unblock a clock is input, the clock gate circuit CG may provide a clock signal to the corresponding IP block (e.g., the second IP block 322).

The clock gating control module 350 may transmit a communication control signal to the CG-network interface module 336 corresponding to the second IP block 322. For example, the clock gating control module 350 may transmit the communication control signal to the CG-network interface module 336, in response to a signal received through the network interface module 331. In this case, the communication control signal may be a signal requesting to block or allow communication of the second CG-network interface module 336 with the second IP block 322.

In an embodiment, receiving the communication control signal requesting to block the communication of the second CG-network interface module 336 with the second IP block 322, the second CG-network interface module 336 may invalidate communication signals transmitted to the second IP block 322 and may provide a notification that it is not ready to receive a signal from the second IP block 322. In this case, because only some (e.g., the second IP block 322)

of the plurality of IP blocks 321-323 is able to be clock-gated, an SoC which supports a partial clock gating function may be provided.

In an embodiment, receiving the communication control signal requesting to allow the communication of the second CG-network interface module 336 with the second IP block 322, the second CG-network interface module 336 may validate communication signals transmitted to the second IP block 322 and may provide a notification that it is ready to receive a signal from the second IP block 322.

The embodiment in which only the second IP block 322 among the plurality of IP blocks 321-323 is clock-gated is described for a brief description, and the scope of the present disclosure is not limited thereto and may include an embodiment in which any number of IP blocks among the plurality of IP blocks are clock-gated.

For a brief description, the SoC 300 including the one network interface module 331 corresponding to the clock gating control module 350, the three IP blocks 321-323, and the three CG-network interface modules 335-337 is illustrated in FIG. 6. However, the scope of the present disclosure is not limited to the number of IP blocks and the number of network interface modules. For example, in some embodiments, all network interface modules except for the network interface module 331 corresponding to the clock gating control module 350 may be implemented to include any number of network interfaces and any number of CG-network interface modules, rather than being implemented as CG-network interface modules. In this case, operations of network interface modules which do not correspond to the clock gating control module 350 may be similar to those described with reference to FIG. 1.

The configuration and function of the clock gating control module 350 will be described in detail with reference to FIG. 7 below. The scheme where the plurality of IP blocks 321-323 and the plurality of CG-network interface modules 335-337 of the SoC 300 are controlled will be described in detail with reference to FIG. 8.

Figure 7:
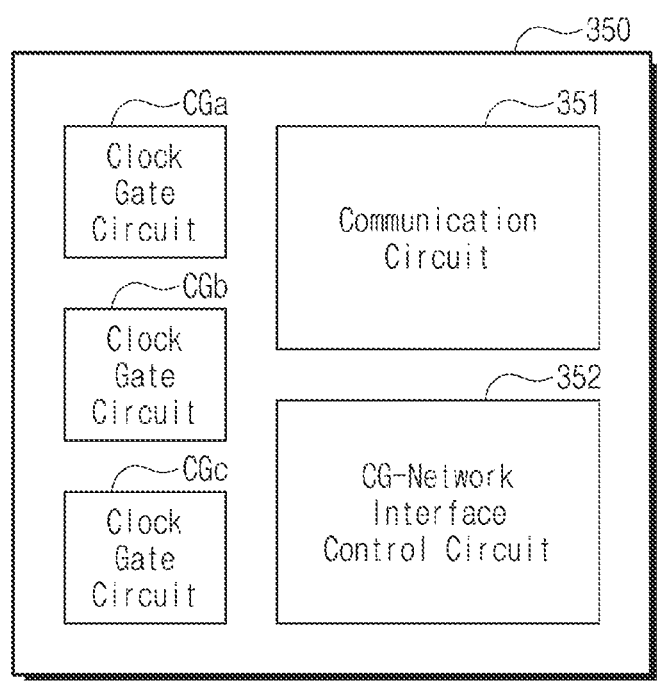
FIG. 7 is a block diagram illustrating in detail a clock gating control module of FIG. 6, according to an embodiment of the present disclosure.

FIG. 7 is a block diagram illustrating in detail a clock gating control module of FIG. 6, according to an embodiment of the present disclosure. Referring to FIGS. 6 and 7, a clock gating control module 350 may include a communication circuit 351, a CG-network interface control circuit 352, and a plurality of clock gate circuits CGa-CGc.

The communication circuit 351 may receive a command or a signal requesting to block or unblock a clock signal of any IP block from an IP block which performs a processor function. For example, a first IP block 321 may request the communication circuit 351 to block or unblock a clock signal of a second IP block 322, through a first CG-network interface module 335 and a network interface module 331.

The CG-network interface control circuit 352 may block communication with an IP block of a corresponding CG-network interface module, based on the command or the signal received by the control circuit 351. For example, the CG-network interface control circuit 352 may request a second CG-network interface module 336 to block communication with the second IP block 322, in response to the request to block the clock signal of the second IP block 322, which is received by the communication circuit 351.

Each of the plurality of clock gate circuits CGa-CGc may transmit a clock gate output signal to a corresponding IP block, based on the command or the signal received by the communication circuit 351. For example, the first clock gate circuit CGa may transmit the clock gate output signal to the first IP block 321, the second clock gate circuit CGb may transmit the clock gate output signal to the second IP block 322, and the third clock gate circuit CGc may transmit the clock gate output signal to a third IP block 323.

In an embodiment, when the communication circuit 351 receives the request to block the clock signal of the second IP block 322, the second clock gate circuit CGb may stop transmitting the clock signal to the second IP block 322.

The three clock gate circuits CGa-CGc are illustrated in FIG. 7 for a brief description, but the scope of the present disclosure is not limited thereto. For example, the clock gating control module 350 may include any number of clock gate circuits depending on the number of IP blocks included in the SoC.

FIG. 8 is a signal sequence diagram illustrating an operation of an SoC of FIG. 6. Hereinafter, operations S300 to S380 indicating operations of an SoC 300 which responds to a clock signal blocking request of a host and operations S400 to S480 indicating operations of the SoC 300 which responds to a clock signal allowance request of the host will be described with reference to FIGS. 6 to 8.

First of all, in operation S300, a first IP block 321 may generate a request to block a clock signal of a second IP block 322. In an embodiment, the first IP block 321 may perform a processor function and may be a host device.

In operation S310, the first IP block 321 may deliver a clock blocking request of the host to a network on chip 330. For example, the first IP block 321 may deliver the clock blocking request to a first CG-network interface module 335.

In operation S320, the first CG-network interface module 335 may deliver the clock blocking request of the host to a network interface module 331. For example, the network interface module 331 may correspond to a clock gating control module 350. In an embodiment, the operation where the clock blocking request of the host is delivered from the first CG-network interface module 335 to the network interface module 331 may be performed by means of control of a router module RO.

In operation S330, the network interface module 331 may deliver the clock blocking request of the host to the clock gating control module 350.

In operation S340, the clock gating control module 350 may deliver a communication control signal to a second CG-network interface module 336. For example, the clock gating control module 350 may generate a communication control signal in response to the clock blocking request of the host and may transmit the communication control signal to the second CG-network interface module 336. In this case, the communication control signal may be a signal requesting to block communication of the second CG-network interface module 336 with the second IP block 322.

In operation S350, the second CG-network interface module 336 may block communication with the second IP block 322. For example, receiving the communication control signal, the second CG-network interface module 336 may invalidate communication signals transmitted to the second IP block 322 or may provide a notification that it is not ready to receive a signal from the second IP block 322.

In operation S360, the clock gating control module 350 may generate a clock gate output signal. For example, the clock gating control module 350 may receive the clock blocking request of the host from the network interface module 331 and may receive various types of clock signals from a PLL block 310, thus outputting a clock gate output signal through the clock gate circuit CG. In this case, the clock gate output signal may be a signal which maintains a low level. In other words, the clock gate circuit CG may not transmit a clock signal to the second IP block 322.

In operation S370, the clock gating control module 350 may provide the clock gate output signal to the second IP block 322.

In operation S380, an internal block signal of the second IP block 322 may be blocked. For example, when the transmission of the clock signal is stopped from the clock gating control module 350, the internal clock signal of the second IP block 322 may be blocked and the second IP block 322 may be in an idle state.

In an embodiment, an order of operations of an SoC 300 which responds to the clock blocking request of the host may be partially changed. For example, operations S340, S360, and S370 described above may be changed in order to be performed.

In an embodiment, after the communication with the second IP block 322 is blocked by the second CG-network interface module 336 in operation S350, as the clock signal of the second IP block 322 is blocked in operation S380, a communication error capable of occurring between the second IP block 322 and the network on chip 330 may be prevented. Thus, the SoC 300 in which a partial clock gating function is implemented may be provided by replacing the network on chip 330 without a change in design of the IP block.

Next, in operation S400, the first IP block 321 may generate a request to unblock the clock signal of the second IP block 322. In an embodiment, the first IP block 321 may perform a processor function and may be a host device.

In operations S410 to S430, the first IP block 321 may deliver a clock signal unblocking request of the host to the clock gate control block 350 through the first CG-network interface module 335 and the second CG-network interface module 336. Because the delivery of the clock signal unblocking request of the host in operations S410 to S430 is similar to that in operations S310 to S330 described above, a detailed description thereof will be omitted.

In operation S440, the clock gating control module 350 may generate a clock gate output signal. For example, the clock gating control module 350 may receive the clock unblocking request of the host from the network interface module 331 and may receive various types of clock signals from the PLL block 310, thus outputting the clock gate output signal. In this case, the clock gate output signal may be the same signal as the clock signal received from the PLL block 310 by the clock gating control module 350. In other words, the clock gate circuit CG may transmit a clock signal to the second IP block 322.

In operation S450, the clock gating control module 350 may deliver the clock gate output signal to the second IP block 322.

In operation S460, an internal block signal of the second IP block 322 may be unblocked. For example, when the clock signal is received from the clock gating control module 350, the second IP block 322 may normally operate.

In operation S470, the clock gating control module 350 may deliver a communication control signal to the second CG-network interface module 336. For example, the clock gating control module 350 may generate a communication control signal in response to the clock unblocking request of the host and may transmit the communication control signal to the second CG-network interface module 336. In this case, the communication control signal may be a signal requesting to allow communication of the second CG-network interface module 336 with the second IP block 322.

In operation S480, the second CG-network interface module 336 may allow communication with the second IP block 322. For example, receiving the communication control signal, the second CG-network interface module 336 may validate communication signals transmitted to the second IP block 322 or may provide a notification that it is ready to receive a signal from the second IP block 322.

In an embodiment, an order of operations of the SoC 300 which responds to the clock unblocking request of the host may be partially changed. For example, operations S440, S450, and S470 described above may be changed in order to be performed.

In an embodiment, irrespective of the clock blocking request or the clock unblocking request of the host, the second IP block 322 may be ready to communicate with the second CG-network interface module 336.

In an embodiment, after the clock signal of the second IP block 322 is unblocked in operation S460, as the communication with the second IP block 322 is allowed by the second CG-network interface module 336 in operation S480, a communication error capable of occurring between the second IP block 322 and the network on chip 330 may be prevented. In this case, the SoC 300 in which a partial clock gating function is implemented may be provided by replacing the network on chip 330 without a change in design of the IP block.

According to the present disclosure, the low power SoC for supporting a partial clock gating function may be provided. In this case, as the partial clock gating function is able to be supported without redesigning IPs, the low power system on chip in which design costs and power consumption are reduced may be provided.

The above-mentioned contents are detailed embodiments for executing the present disclosure. The present disclosure may include embodiments capable of being simply changed in design or being easily changed, as well as the above-mentioned embodiments. Furthermore, the present disclosure may also include technologies capable of being easily modified and executed using embodiments. Therefore, the spirit and scope of the present disclosure is defined not by the above-described embodiments, but by those that are identical or equivalent to the claims of the present disclosure as well as the appended claims, which will be described below.

What is claimed is:

1. A network on chip, comprising:
   a first clock gate circuit (CG)-network interface that supports communication of a first intellectual property (IP) block;
   a second CG-network interface that supports communication of a second IP block; and
   a clock gating controller,
   wherein the clock gating controller receives a clock gating request from the first IP block, outputs a communication control signal to the second CG-network interface in response to the received clock gating request, and performs a clock gating operation for a clock signal in response to the received clock gating request to selectively deliver the clock signal to the second IP block, and
   wherein the communication control signal is either:
   a signal requesting the second CG-network interface not to allow communication with the second IP block, when the received clock gating request indicates blocking a clock of the second IP block; or
   a signal requesting the second CG-network interface to allow communication with the second IP block, when the received clock gating request indicates unblocking the clock of the second IP block.

2. The network on chip of claim 1, further comprising:
a router that controls communication between the first CG-network interface and the second CG-network interface.

3. The network on chip of claim 1, further comprising:
a network interface that supports communication between the clock gating controller and the first CG-network interface.

4. The network on chip of claim 3, further comprising:
a router that controls the communication between the clock gating controller and the first CG-network interface.

5. The network on chip of claim 1, wherein the communication control signal is the signal requesting the second CG-network interface not to allow communication with the second IP block, when the received clock gating request indicates blocking the clock of the second IP block, and
wherein the clock gating controller blocks the clock signal such that the clock signal is not delivered to the second IP block.

6. The network on chip of claim 5, wherein the clock gating controller blocks the clock signal, after the second CG-network interface blocks the communication with the second IP block.

7. The network on chip of claim 1, wherein the communication control signal is the signal requesting the second CG-network interface to allow communication with the second IP block, when the received clock gating request indicates unblocking the clock of the second IP block, and
wherein the clock gating controller delivers the clock signal to the second IP block.

8. The network on chip of claim 7, wherein the clock gating controller delivers the clock signal to the second IP block, before the second CG-network interface allows the communication with the second IP block.

9. The network on chip of claim 1, wherein the clock gating controller includes a clock gate that performs the clock gating operation.

10. A system on chip, comprising:
a network on chip including a first CG-network interface, a second CG-network interface, and a clock gating controller;
a first IP block that communicates through the first CG-network interface; and
a second IP block that communicates through the second CG-network interface,
wherein the clock gating controller receives a clock gating request from the first IP block, outputs a communication control signal to the second CG-network interface in response to the received clock gating request, and performs a clock gating operation for a clock signal in response to the received clock gating request to selectively deliver the clock signal to the second IP block, and wherein the communication control signal is either:
a signal requesting the second CG-network interface not to allow communication with the second IP block, when the received clock gating request indicates blocking a clock of the second IP block; or
a signal requesting the second CG-network interface to allow communication with the second IP block, when the received clock gating request indicates unblocking the clock of the second IP block.

11. The system on chip of claim 10, further comprising:
a phase-locked loop (PLL) block that generates the clock signal and provides the generated clock signal to the clock gating controller.

12. The system on chip of claim 10, wherein the network on chip further includes:
a router that controls communication between the first CG-network interface and the second CG-network interface.

13. The system on chip of claim 10, wherein the network on chip further includes:
a network interface that supports communication between the clock gating controller and the first CG-network interface.

14. The system on chip of claim 13, wherein the network on chip further includes:
a router that controls the communication between the clock gating controller and the first CG-network interface.

15. The system on chip of claim 10, wherein the communication control signal is the signal requesting the second CG-network interface not to allow communication with the second IP block, when the received clock gating request indicates blocking the clock of the second IP block, and
wherein the clock gating controller blocks the clock signal such that the clock signal is not delivered to the second IP block.

16. The system on chip of claim 15, wherein the clock gating controller blocks the clock signal, after the second CG-network interface blocks the communication with the second IP block.

17. The system on chip of claim 10, wherein the communication control signal is the signal requesting the second CG-network interface to allow communication with the second IP block, when the received clock gating request indicates unblocking the clock of the second IP block, and
wherein the clock gating controller delivers the clock signal to the second IP block.

18. The system on chip of claim 17, wherein the clock gating controller delivers the clock signal to the second IP block, before the second CG-network interface allows the communication with the second IP block.

19. The system on chip of claim 10, wherein the first IP block performs a processor function.

20. The system on chip of claim 10, wherein the clock gating controller includes:
a clock gate that performs the clock gating operation.

* * * * *